(12) United States Patent
He et al.

(10) Patent No.: US 12,229,570 B2
(45) Date of Patent: Feb. 18, 2025

(54) BLOCK DATA LOAD WITH TRANSPOSE INTO MEMORY

(71) Applicant: Advanced Micro Devices, Inc., Santa Clara, CA (US)

(72) Inventors: Bin He, Oviedo, FL (US); Michael John Mantor, Orlando, FL (US); Brian Emberling, Palo Alto, CA (US); Liang Huang, Pudong District (CN); Chao Liu, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 34 days.

(21) Appl. No.: 17/952,270

(22) Filed: Sep. 25, 2022

(65) Prior Publication Data

US 2024/0103879 A1    Mar. 28, 2024

(51) Int. Cl.
*G06F 9/30* (2018.01)
*G06F 1/20* (2006.01)
*G06F 9/38* (2018.01)
*G06F 15/80* (2006.01)

(52) U.S. Cl.
CPC ............ *G06F 9/3887* (2013.01); *G06F 1/20* (2013.01); *G06F 9/3001* (2013.01); *G06F 9/30036* (2013.01); *G06F 9/30043* (2013.01); *G06F 9/30098* (2013.01); *G06F 15/8007* (2013.01)

(58) Field of Classification Search
CPC ........ G06F 9/3887; G06F 1/20; G06F 9/3001; G06F 9/30036; G06F 9/30043; G06F 9/30098; G06F 15/8007
See application file for complete search history.

(56) References Cited

U.S. PATENT DOCUMENTS

2020/0371795 A1\*  11/2020  Zbiciak ............... G06F 9/30105
2022/0207107 A1\*  6/2022  Adelman ............ G06F 9/30036

OTHER PUBLICATIONS

Abts et al.; Think Fast: A Tensor Streaming Processor (TSP) for Accelerating Deep Learning Workloads; IEEE; 2020 (Year: 2020).\*

\* cited by examiner

*Primary Examiner* — Corey S Faherty
(74) *Attorney, Agent, or Firm* — FIG. 1 Patents

(57) ABSTRACT

Block data load with transpose techniques are described. In one example, an input is received, at a control unit, specifying an instruction to load a block of data to at least one memory module using a transpose operation. Responsive to the receiving the input by the control unit, the block of data is caused to be loaded to the at least one memory module by transposing the block of data to form a transposed block of data and storing the transposed block of data in the at least one memory.

20 Claims, 4 Drawing Sheets

BLOCK DATA LOAD WITH TRANSPOSE INTO MEMORY

BACKGROUND

The amounts of data used by computing devices continue to increase in support of a corresponding increase in functionality made available by the computing devices. Functionality used in support of digital image processing, for instance, involves processing ever increasing resolutions of digital images. Likewise, use of vast amounts of data continue to expand in support of machine learning and artificial intelligence functionality. However, conventional techniques used to manage data storage in support of this functionality also introduce inefficiencies. These inefficiencies are compounded when confronted with the continual increases in the amounts of data that are subject of this management, thereby hindering operation of these devices.

BRIEF DESCRIPTION OF THE DRAWINGS

The detailed description is described with reference to the accompanying figures.

DETAILED DESCRIPTION

Figure 1:
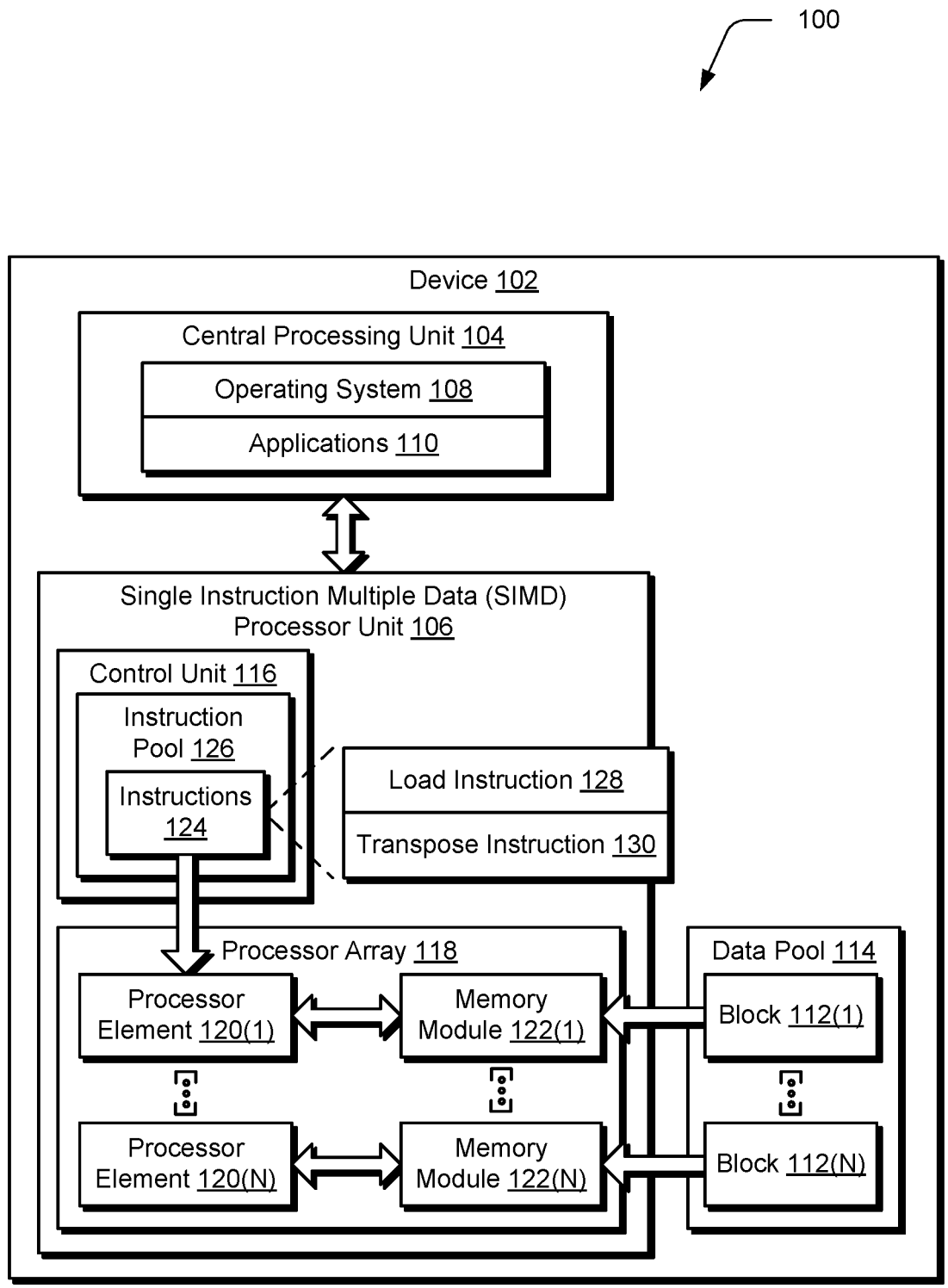
FIG. 1 is a block diagram of a non-limiting example system configured to employ block data load with transpose into memory techniques.

Functionality made available by computing devices continues to expand, and the amounts of data utilized in support of this functionality also continues to increase. Examples of this are prevalent in machine learning, artificial intelligence, digital image and digital media processing, and so forth. Conventional techniques involved in managing transfer, storage, and processing of this data are challenged by these increases. Further, an effect of any inefficiency is compounded and has a detrimental effect on computing device operation due to these increases.

To solve these problems, block data load with transpose techniques are described. These techniques are usable to improve operational efficiency in loading data by a device. The transpose instruction, for instance, causes a transpose operation to be performed as part of loading data elements, e.g., a block of data from a persistent storage device to local registers of a processor unit. As a result, the transpose instruction reduces a number of operations and instructions otherwise involved in loading data elements and therefore increases operational efficiency of devices that employ these techniques.

In one example, the transpose instruction is utilized as part of tiling data in memory to improve locality of data reuse within each memory access, e.g., when accessing a block of data in two or three dimensions. An example of a block of data includes a matrix configured as a rectangular array of data arranged in rows and columns that is manipulable as a single entity. Therefore, in this example the transpose operation involves interchanging rows and corresponding columns in the matrix. In instances in the following discussion, examples involving a matrix and transposition are described as but one example of a block of data.

By rearranging the manner in which data is placed in memory, for instance, a block of two-dimensional data is fetchable with one request and a single cache line. This is usable to both minimize an amount of bandwidth used by minimizing occurrences of an "over" fetch as well as maximize cache utilization for block operations, such as matrix multiplication. Two input two-dimensional blocks of tensor data, for instance, used in matrix multiplication have these characteristics and thus support of these techniques operates to minimize data movement and power consumption while increasing cache and internal buffering effectiveness. This technique, for instance, is usable to perform a matrix transpose "on the fly" during a fetch and load of data of the matrix. A variety of other instances are also contemplated, examples of which are described in the following discussion and shown using corresponding figures.

In some aspects, the techniques described herein relate to a method including: receiving an input, at a control unit, specifying an instruction to load a block of data to at least one memory module using a transpose operation; and responsive to the receiving the input by the control unit, causing the block of data to be loaded to the at least one memory module by: transposing the block of data to form a transposed block of data; and storing the transposed block of data in the at least one memory.

In some aspects, the techniques described herein relate to a method, wherein the instruction is a single instruction causing both the block of data to be loaded to the at least one memory module by transposing the block of data to form the transposed block of data and the storing of the transposed block of data in the at least one memory.

In some aspects, the techniques described herein relate to a method, wherein: the control unit is part of a single instruction multiple data (SIMD) processor unit that includes a plurality of said memory modules; and the transposing and the storing are performed concurrently for a plurality of said blocks of data.

In some aspects, the techniques described herein relate to a method, wherein the block of data is configured as a matrix that is column major and the transposing forms the transposed block of data as a matrix that is row major.

In some aspects, the techniques described herein relate to a method, wherein the block of data is configured as a matrix that is row major and the transposing forms the transposed block of data as a matrix that is column major.

In some aspects, the techniques described herein relate to a method, wherein: a plurality of said memory modules are communicatively coupled, respectively, to a plurality of processor elements as part of a single instruction multiple data (SIMD) processor unit; and the plurality of said memory modules are implemented, respectively, using respective vector general-purpose registers (VGPRs).

In some aspects, the techniques described herein relate to a method, wherein: the control unit implements functionality to decode and issue the instruction; the plurality of memory modules is implemented, respectively, using a plurality of registers; and the plurality of processor elements is implemented, respectively, using respective arithmetic-logic units (ALUs) that are configured to perform the instruction issued by the control unit.

In some aspects, the techniques described herein relate to a method, wherein the transposing is performed using corner turn logic.

In some aspects, the techniques described herein relate to a single instruction multiple data (SIMD) processor unit including: a processor array including a plurality of processor elements that are executable to execute single instructions concurrently to process, respectively, a plurality of data elements maintained in a plurality of memory modules; and a control unit configured to implement a load-and-transpose instruction that is executable to cause data of the plurality of data elements to be transposed and loaded into the plurality of memory modules, respectively.

In some aspects, the techniques described herein relate to a single instruction multiple data (SIMD) processor unit, wherein the load-and-transpose instruction is a single instruction and the data is configured as matrixes.

In some aspects, the techniques described herein relate to a single instruction multiple data (SIMD) processor unit, wherein: the plurality of memory modules is implemented, respectively, using vector general-purpose registers (VGPRs); and the plurality of processor elements is implemented, respectively, using respective arithmetic-logic units (ALUs) that are configured to perform the single instructions issued by the control unit.

In some aspects, the techniques described herein relate to a single instruction multiple data (SIMD) processor unit, wherein the data is configured as a matrix that is column major and the load-and-transpose instruction causes formation of transposed data configured as a matrix that is row major.

In some aspects, the techniques described herein relate to a single instruction multiple data (SIMD) processor unit, wherein the data is configured as a matrix that is row major and the load-and-transpose instruction causes formation of transposed data configured as a matrix that is column major.

In some aspects, the techniques described herein relate to a method including: responsive to receiving a load-and-transpose instruction at a control unit, loading training data having a plurality of matrix data, the loading including: transposing the plurality of matrix data to form a plurality of transposed matrix data; and storing the plurality of transposed matrix data, respectively, in a plurality of memory modules; and training a machine-learning model by executing a single instruction, concurrently, to process the plurality of transposed matrix data by a plurality of processor elements that are communicatively to the plurality of memory modules.

In some aspects, the techniques described herein relate to a method, wherein the loading and the training are performed by a single instruction multiple data (SIMD) processor unit that includes the control unit and the plurality of processor elements.

In some aspects, the techniques described herein relate to a method, wherein at least one said matrix data is column major and at least one said transposed matrix data transposed from the at least one said matrix data is row major.

In some aspects, the techniques described herein relate to a method, wherein at least one said matrix data is row major and at least one said transposed matrix data transposed from the at least one said matrix data is column major.

In some aspects, the techniques described herein relate to a method, wherein: the control unit implements functionality to decode and issue the single load-and-transpose instruction; the plurality of memory modules is implemented, respectively, using a plurality of registers; and the plurality of processor elements is implemented, respectively, using respective arithmetic-logic units (ALUs) that are configured to perform the single load-and-transpose instruction issued by the control unit.

In some aspects, the techniques described herein relate to a method, further including: processing subsequent data using the trained machine-learning model; and outputting a result of the processing.

In some aspects, the techniques described herein relate to a method, wherein the processing includes matrix multiplication.

FIG. 1 is a block diagram of a non-limiting example system 100 configured to employ block data load with transpose into memory techniques. The example system 100 includes a device 102 having a central processing unit 104 communicatively coupled to a single instruction multiple data (SIMD) processor unit 106. Other configurations are also contemplated, including implementation of the techniques on a single processor unit, system-on-a-chip, and so forth.

Examples of the device 102 include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 102 is configured as any one or more of those devices listed just above and/or a variety of other devices without departing from the spirit or scope of the described techniques.

In the illustrated example, the central processing unit 104 executes software (e.g., an operating system 108, applications 110, etc.) to issue instructions to the SIMD processor unit 106 to perform operations. The SIMD processor unit 106, also referred to as a short vector processor, is configured to concurrently process a plurality of blocks 112(1)-112(N) of data from a data pool 114. The data pool 114 is illustrated in this example as configured external to the SIMD processor unit 106 (e.g., as persistent storage), although other examples are also contemplated.

The SIMD processor unit 106, for instance, includes a control unit 116 and a processor array 118 having a plurality of processor elements 120(1)-120(N) and corresponding memory modules 122(1)-122(N). The control unit 116 (e.g., a sequencer) is representative of functionality of the SIMD processor unit 106 to decode and issue instructions 124 from an instruction pool 126. The processor elements 120(1)-120(N) are configurable as arithmetic-logic units (ALUs) implemented in hardware (e.g., as a circuit) that carries out arithmetic and logic operations.

The memory modules 122(1)-122(N) are configured as registers (e.g., vector general-purpose registers (VGPRs)) that are communicatively coupled to respective ones of the processor elements 120(1)-120(N). In one example, the memory modules 122(1)-122(N) are communicatively coupled directly to respective processor elements 120(1)-120(N), e.g., as part of respective processor elements. In another example, a switching network is used in support of the communicative coupling between the processor elements 120(1)-120(N) and the memory modules 122(1)-122(N). Other examples are also contemplated, e.g., through an interconnection network, a mesh connected architecture, and so forth.

The processor array 118 is implemented in this example as a collection of processor elements 120(1)-120(N) that is synchronized to support parallel computing of a single one of the instructions 124 on various data elements, e.g., blocks 112(1)-112(N). The parallel operation of the processor elements 120(1)-120(N) is usable to support improved processing in a variety of different usage scenarios, examples of which include machine learning, artificial intelligence, image processing, video and sound applications, speech rendering, network, digital signal processing, and so forth. The control unit 116, for instance, issues single data words having multiple pieces of data stored, respectively, in the memory modules 122(1)-122(N) are processed using a single instruction. This is performable as a series of single instructions that are applied in succession to each of the pieces of data stored in the memory modules 122(1)-122(N). Thus, this process can continue for successive instructions as executed by the processor elements 120(1)-120(N) that are applied to data stored respective memory modules 122(1)-122(N).

Examples of instructions 124 included in the instruction pool 126 include a load instruction 128 and a transpose instruction 130. The load instruction 128 is configured to cause data loading from the data pool 114 to respective memory modules 122(1)-122(N) communicatively coupled to the processor array 118, e.g., the registers. This data is then subject to processing by executing instructions using respective processor elements 120(1)-120(N). In some instances, however, functionality of the processor elements 120(1)-120(N) is limited to specific data layout. For example, arithmetic and logic operations performed by the processor elements 120(1)-120(N) as configured as arithmetic-logic units (ALUs) are configured in some instances to process data having a particular configuration. Therefore, conventional techniques are forced to engage in a series of operations in these instances to conform data to comply with these layouts. As described above, however, the vast amount of data involved in real-world scenarios hinders operation of devices to load this data and consequently has an adverse effect on power consumption and bandwidth.

Accordingly, the instruction pool 126 also includes a transpose instruction 130 that is configured to support this conversion from one layout to another. In the illustrated example, a layout of a plurality of blocks 112(1)-112(N) is reconfigured for each of the blocks as part of loading into the respective memory modules 122(1)-122(N). Thus, in this example a single transpose instruction 130 is useable to perform this reconfiguration, thereby reducing bandwidth and power consumption of the device 102.

Figure 2:
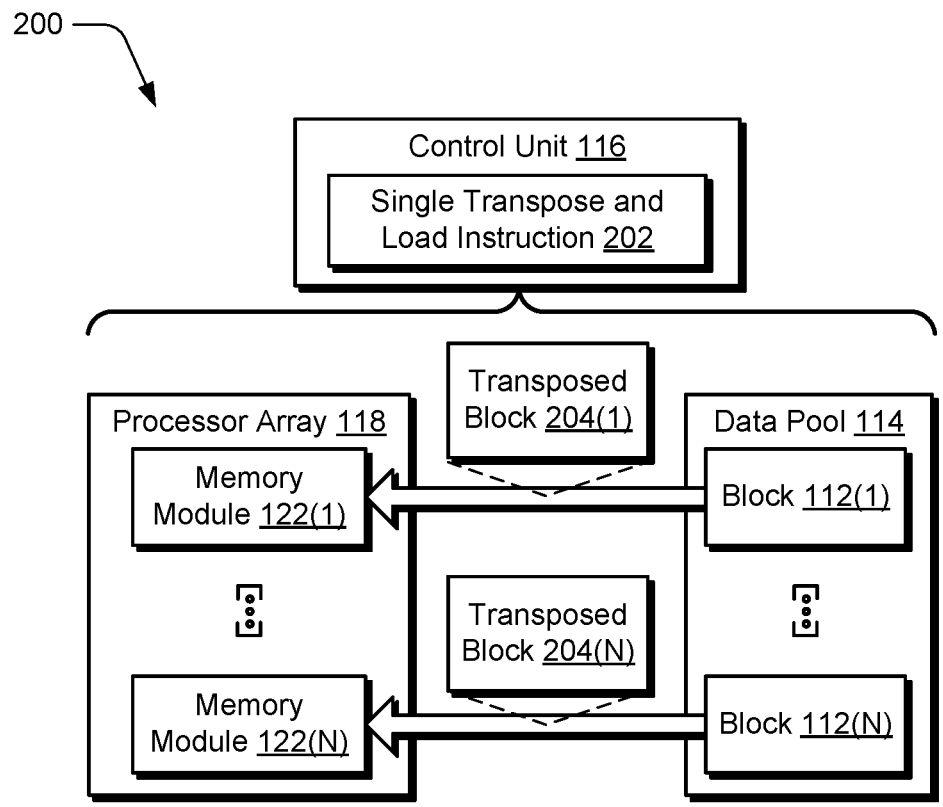
FIG. 2 is a block diagram of a non-limiting example system configured to employ a single transpose and load instruction usable to load block data with transpose into memory.

FIG. 2 is a block diagram of a non-limiting example system 200 configured to employ a single transpose and load instruction usable to load block data with transpose into memory. In this example, the load instruction 128 and the transpose instruction 130 from FIG. 1 are implemented as a single transpose and load instruction 202 that is callable to the control unit 116, e.g., via a respective application programming interface.

A single call and execution of this instruction causes generation of a plurality of transposed blocks 204(1)-204(N) of data "on the fly" as part of loading a plurality of blocks 112(1)-112(N) of data from the data pool 114. The control unit 116, as part of generating the plurality of transposed blocks 204(1)-204(N) reorganizes the data in the plurality of blocks 112(1)-112(N) such that this data is in a form that is suitable for processing by desired functionality of the processor units 120(1)-120(N). This is performed using the fixed pattern remapping logic such that the data is reconfigured as part of the loading directly to the memory modules 122(1)-122(N), e.g., an intermediate representation is not maintained thereby improving efficiency. Other examples are also contemplated.

Figure 3:
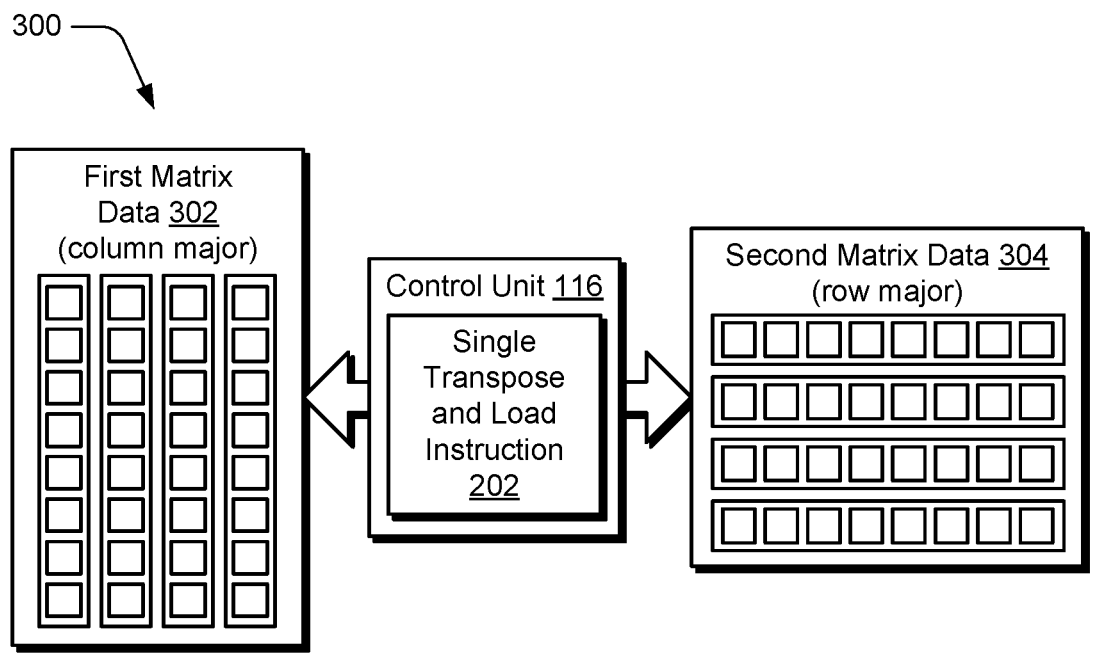
FIG. 3 is a block diagram of a non-limiting example system configured to employ a single transpose and load instruction usable to transpose and load matrix data into memory.

FIG. 3 is a block diagram of a non-limiting example system 300 configured to employ a single transpose and load instruction usable to transpose and load matrix data into memory. The blocks 112(1)-112(N) of data of FIGS. 1 and 2 are configurable in a variety of ways, an example of which include a matrix. A matrix is configured as a rectangular array of data arranged in rows and columns that is manipulable as a single entity. Matrixes are configurable as "column major" and "row major." The first matrix data 302, for instance, is an example of column major in which data entries in the matrix corresponding to a particular entity are arranged in columns. Likewise, the second matrix data 304 is an example of row major in which data entries in the matrix corresponding to a particular entity are arranged in columns.

Although there is software functionality to transpose matrixes, there are a variety of usage scenarios in which this functionality does not take advantage of efficiencies gained through physical arrangement of data in memory. For example, in the illustrated example, column major arrangement of the first matrix data 302 results in discontinuous arrangement of data corresponding to a particular entity (e.g., a byte of data) in physical memory. However, a row major arrangement of the second matrix data 304, the rows of the matrix are contiguous in memory.

Accordingly, in this example use of the single transpose and load instruction 202 to transpose the first matrix data 302 as column major to form second matrix data 304 that is row major improves performance by increasing memory locality. The transpose instruction, for instance, is utilized as part of tiling data in memory to improve locality of data reuse within each memory access, e.g., when accessing a block of data in two or three dimensions. The single transpose and load instruction 202 is also usable to take as an input the second matrix data 302 that is row major and from this generate the first matrix data 302 that is column major. In an implementation, this is performed by leveraging corner turn logic that is used to reorganize the data and a fixed pattern data remap, e.g., for a 16×16 matrix transpose. Corner turn logic, for instance, is usable for multiple buses of data to capture an output from successive storage elements from single respective buses, together, in a respective cycle. Thus, in this example the single transpose and load instruction 202 is invokable to transpose an input matrix to a different type (e.g., column major or row major) regardless of the input type.

By rearranging the manner in which data is placed in memory, for instance, a block of two-dimensional data is fetchable with one request and a single cache line. This is usable to both minimize an amount of bandwidth used by minimizing occurrences of an "over" fetch as well as maximize cache utilization for block operations, such as matrix multiplication. Two input two-dimensional blocks of tensor data (e.g., a n-dimensional array of data), for instance, used in matrix multiplication have these characteristics and thus support of these techniques operates to minimize data movement and power consumption while increasing cache and internal buffering effectiveness. This technique, for instance, is usable to perform a matrix transpose "on the fly" during a fetch and load of data of the matrix.

Figure 4:
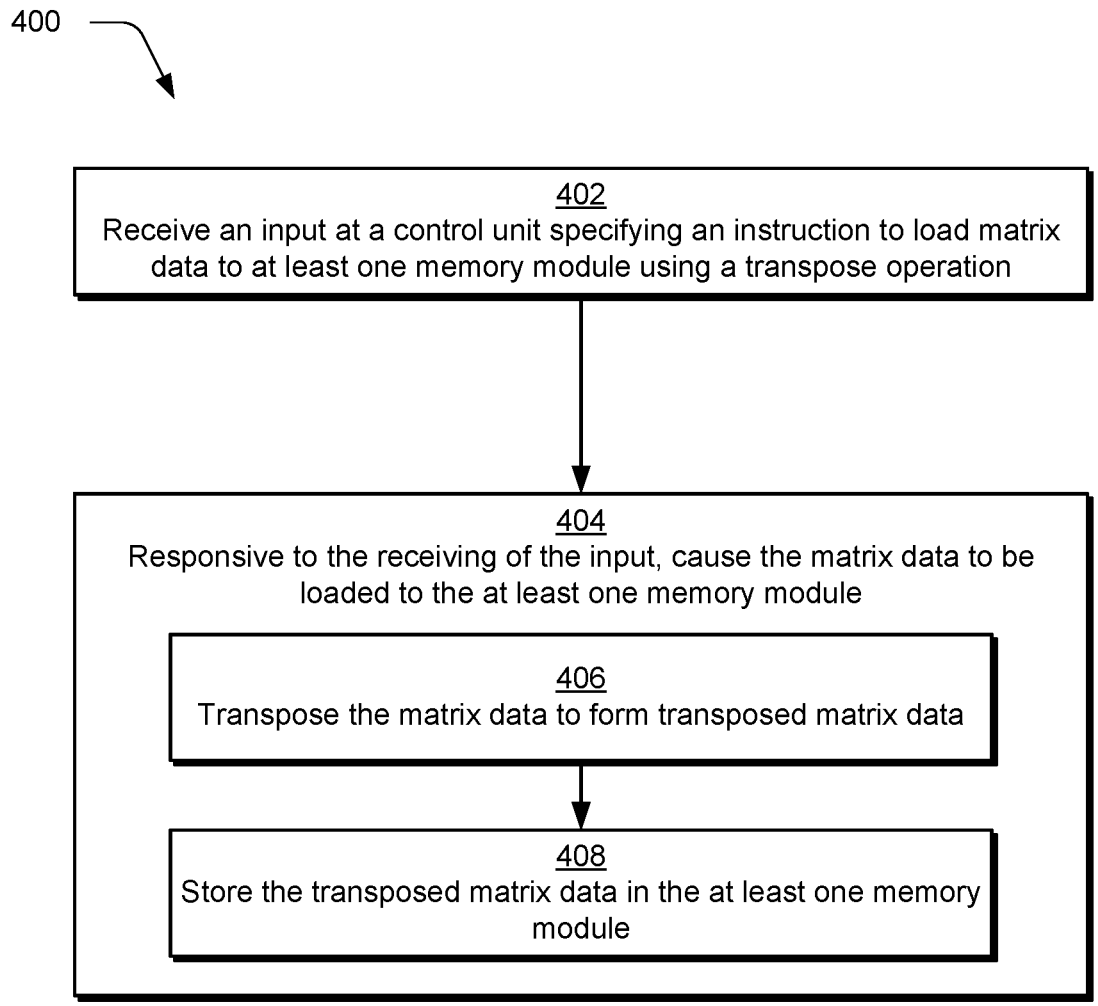
FIG. 4 depicts a procedure in an example implementation of block data load with transpose into memory.

FIG. 4 depicts a procedure 400 in an example implementation of block data load with transpose into memory. An input is received at a control unit specifying an instruction to load matrix data to at least one memory module using a transpose operation (block) 402). By way of example, this is performable in one scenario to invoke the transpose instruction 130 to cause the load operation, alone, on a single memory item. In another example, the transpose instruction 130 is a single instruction that causes performance of the transpose operation of a plurality of blocks 112(1)-112(N). In a further example, this is performed as a single transpose and load instruction 202 that causes both loading and transposing of the plurality of blocks 112(1)-112(N) of data to, respectively, a plurality of memory modules 122(1)-122(N) as part of a single instruction multiple data (SIMD) architecture.

Responsive to the receiving of the input, the matrix data is caused to be loaded to at least one memory module (block 404). By way of example, the matrix data is transposed to form transposed matrix data (block 406) "on the fly" as part of the loading to store the transposed matrix data in the at least one memory module (block 408). In an implementation, corner turn logic and a fixed pattern data remap are used, e.g., to transpose a matrix from column major to row major or from row major to column major. This is usable to support the variety of examples above including use of a transpose operation, alone, use of a single combined load and transpose operation, as part of a single instruction multiple data architecture, and so forth. A variety of other examples are also contemplated.

Figure 5:
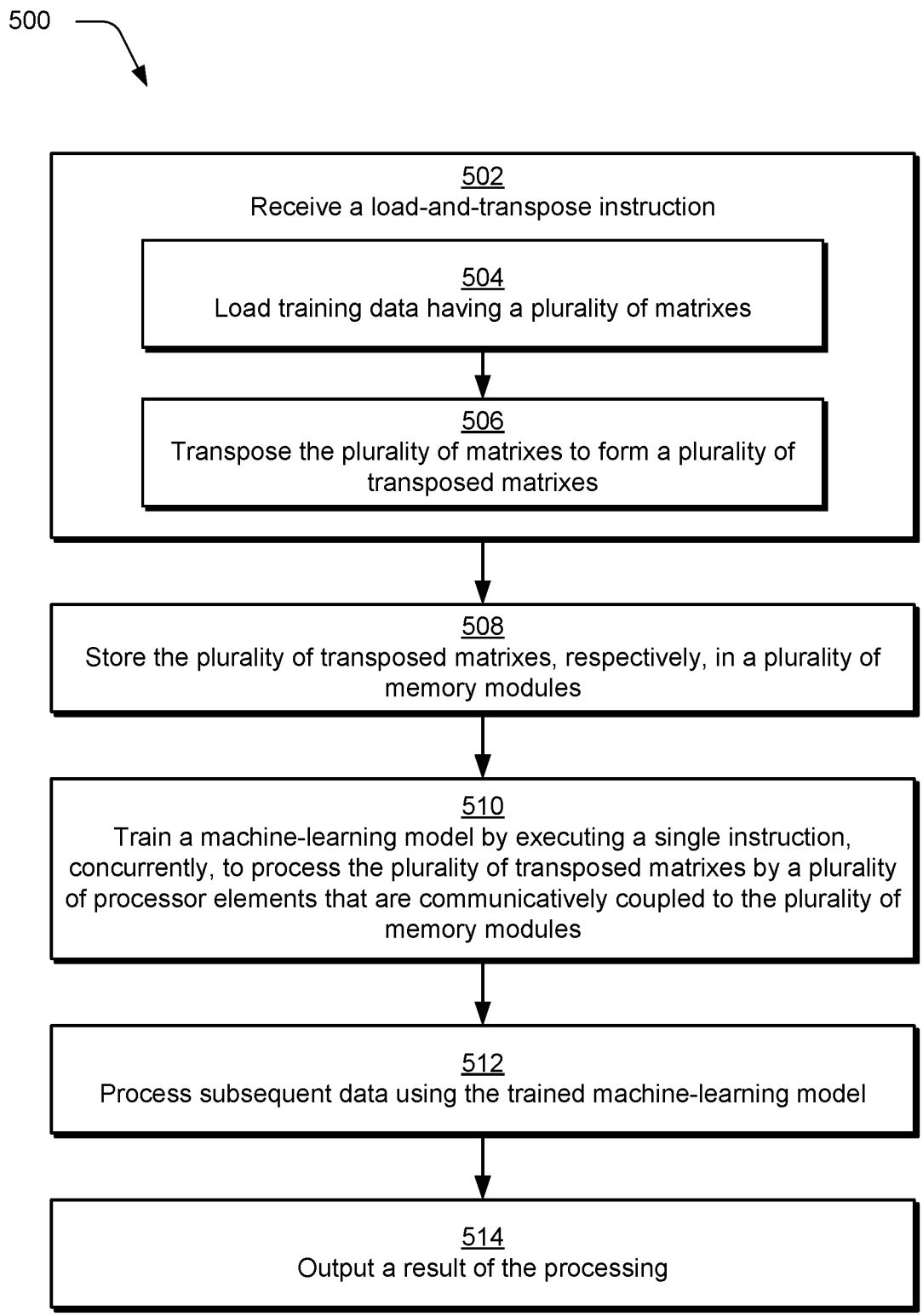
FIG. 5 depicts a procedure in an example implementation of use of block data load with transpose as part of training a machine-learning model.

FIG. 5 depicts a procedure 500 in an example implementation of use of block data load with transpose as part of training a machine-learning model. As training progresses between layers in training a machine-learning model, data that is passed between the layers in some instances alternates between different matrix formats. A first layer, for instance, outputs data that is column major, which results in discontinuous storage in physical memory. Accordingly, through use of the load with transpose techniques described herein operational efficiency and power consumption is improved as part of training a machine-learning model.

A load-and transpose instruction is received (block 502). By way of example, training data having a plurality of matrixes is loaded (block 504) and the plurality of matrixes are transposed to form a plurality of transposed matrixes (block 506). An application 110, for instance, provides the single load and transpose instruction 202 as an input to a control unit of the SIMD processor unit 106.

The plurality of transposed matrixes are stored, respectively, in a plurality of memory modules (block 508). By way of example, the control unit 116 causes a plurality of transposed matrixes to be stored in respective memory modules 122(1)-122(N), e.g., in response to a single instruction.

A machine-learning model is trained by executing a single instruction, concurrently, to process the plurality of transposed matrixes by a plurality of processor elements that are communicatively coupled to the plurality of memory modules (block 510). By way of example, the processor elements 120(1)-120(N) execute a series of sequential single instructions to process the training data stored in respective memory modules 122(1)-122(N). This causes generation of a trained machine-learning model having connections and weights that are learned through the training.

Once trained, subsequent data is processed using the training machine-learning model (block 512) and a result of the processing is output (block 514). By way of example, the subsequent data involves a variety of different usage scenarios, examples of which include machine learning, artificial intelligence, image processing, video and sound applications, speech rendering, network, digital signal processing, and so forth.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
   responsive to receiving, by a control circuit of a processor, a single transpose and load instruction specifying a plurality of blocks of data to be processed in a transposed form by a processor array of the processor, fetching, by the control circuit of the processor, the data for processing by storing the transposed form of the data in at least one memory module circuit of the processor array without generating an intermediate representation of the transposed form of the data; and
   processing, by the processor array, the transposed form of the data stored in the at least one memory module circuit.

2. The method of claim 1, wherein:
   the processor is part of a single instruction multiple data (SIMD) processor unit that includes the processor array and the at least one memory module circuit of the processor array.

3. The method of claim 1, wherein the plurality of blocks of data includes a first matrix that is column major and the transposed form of the data includes a second matrix that is row major.

4. The method of claim 1, wherein the plurality of blocks of data includes a first matrix that is row major and the transposed form of the data includes a second matrix that is column major.

5. A processor comprising:
a control circuit configured to:
receive a single transpose and load instruction specifying a plurality of blocks of data to be maintained in at least one memory module circuit in a transposed form that is suitable for processing; and
responsive to receiving the single transpose and load instruction, fetch the data by storing the transposed form of the data in the at least one memory module circuit without maintaining an intermediate representation of the transposed form of the data; and
a processor array configured to process the transposed form of the data.

6. The processor of claim 5, wherein the processor array includes the at least one memory module circuit.

7. The processor of claim 6, wherein the processor array includes at least one processor element corresponding to the at least one memory module circuit.

8. The processor of claim 5, wherein the plurality of blocks of data includes a first matrix that is column major and the transposed form of the data includes a second matrix that is row major.

9. The processor of claim 5, wherein the plurality of blocks of data includes a first matrix that is row major and the transposed form of the data includes a second matrix that is column major.

10. The processor of claim 5, wherein the plurality of blocks of data includes training data for training a machine-learning model.

11. The processor of claim 10, wherein the processor array is further configured to train the machine-learning model based on the transposed form of the data.

12. The processor of claim 11, wherein the processor array is further configured to:
process subsequent data using the trained machine-learning model; and
output a result of processing the subsequent data.

13. The processor of claim 12, wherein, in being configured to process the subsequent data, the processor array is configured to perform matrix multiplication.

14. A device comprising:
a central processing unit configured to execute an application to issue a single transpose and load instruction specifying a plurality of blocks of data to be processed in a transposed form;
a processor array configured to process the transposed form of the data from at least one memory module circuit of the processor array; and
a control circuit configured to:
receive the single transpose and load instruction from the central processing unit; and
responsive to receiving the single transpose and load instruction, fetch the data by storing the transposed form of the data in the at least one memory module circuit without maintaining an intermediate representation of the transposed form of the data.

15. The device of claim 14, wherein the plurality of blocks of data includes a first matrix that is column major and the transposed form of the data includes a second matrix that is row major, or the first matrix is row major and the second matrix is column major.

16. The device of claim 14, wherein the control circuit includes fixed pattern remapping logic that transposes the data into the transposed form without maintaining the intermediate representation.

17. The device of claim 16, wherein the fixed pattern remapping logic includes corner turn logic that transposes the data into the transposed form without maintaining the intermediate representation.

18. The device of claim 14, wherein the control circuit transposes the data into the transposed form as part of the storing the transposed form of the data in the at least one memory module circuit without maintaining the intermediate representation.

19. The device of claim 14, further comprising a data pool that maintains the plurality of blocks of the data, and the control circuit is configured to fetch the data from the data pool by storing the transposed form of the data in the at least one memory module circuit without maintaining an intermediate representation of the transposed form of the data.

20. The device of claim 19, wherein the data pool is configured as external storage coupled to the processor array, and the at least one memory module circuit is configured as one or more registers of the processor array.

* * * * *